(12) United States Patent
Jansen et al.

(10) Patent No.: US 9,313,999 B2
(45) Date of Patent: Apr. 19, 2016

(54) DISPENSER

(71) Applicant: Farmweld Inc., Teutopolis, IL (US)

(72) Inventors: Ryan Jansen, Teutopolis, IL (US); Jonathan Wakefield, Shumway, IL (US); Francis Brummer, Teutopolis, IL (US)

(73) Assignee: Farmweld Inc., Teutopolis, IL (US)

( * ) Notice: Subject to any disclaimer, the term of this patent is extended or adjusted under 35 U.S.C. 154(b) by 21 days.

(21) Appl. No.: 14/154,384

(22) Filed: Jan. 14, 2014

(65) Prior Publication Data

US 2014/0197206 A1  Jul. 17, 2014

Related U.S. Application Data

(60) Provisional application No. 61/752,525, filed on Jan. 15, 2013.

(30) Foreign Application Priority Data

Jul. 12, 2013 (CA) ...................................... 2820813

(51) Int. Cl.
*B67D 7/06* (2010.01)
*A01K 5/02* (2006.01)
*A01K 39/012* (2006.01)

(52) U.S. Cl.
CPC ............. *A01K 5/0225* (2013.01); *A01K 39/012* (2013.01)

(58) Field of Classification Search
CPC ..... A01K 39/012; A01K 39/014; A01K 5/00; A01K 5/0225
USPC ................... 222/185.1, 181.1, 500–510, 517; 119/51.01, 53, 53.5, 52.2, 54, 57, 57.5
See application file for complete search history.

(56) References Cited

U.S. PATENT DOCUMENTS

| | | | |
|---|---|---|---|
| 5,036,798 A * | 8/1991 | King | 119/53.5 |
| 5,603,285 A * | 2/1997 | Kleinsasser | 119/53 |
| 5,921,200 A * | 7/1999 | Bondarenko et al. | 119/52.1 |
| 6,330,867 B1 * | 12/2001 | Rasmussen | 119/52.1 |
| 6,923,142 B2 | 8/2005 | Kleinsasser | |
| 7,975,648 B2 * | 7/2011 | Kleinsasser | 119/53 |
| 8,939,109 B2 * | 1/2015 | Kleinsasser | A01K 5/00 |
| | | | 119/53.5 |

* cited by examiner

*Primary Examiner* — Lien Ngo
(74) *Attorney, Agent, or Firm* — The Webb Law Firm

(57) ABSTRACT

A dispenser for animal feed or other granular material in which the material is dispensed as a mound, includes a dispenser body with a container having an outlet for discharging material by gravity feed onto a surface, a shelf or other moveable member beneath the outlet that travels vertically relative to the container to vary the gap between the container outlet and the surface, and an actuator to permit adjustment of the moveable member. The actuator uses frictional force to retain the moveable member in a selected position, which can be adjusted by overcoming the frictional force.

25 Claims, 11 Drawing Sheets

DISPENSER

CROSS REFERENCE TO RELATED APPLICATIONS

This application claims priority pursuant to the Paris Convention based on Canadian Patent Application No. 2,820,813, filed on Jul. 12, 2013 and U.S. Provisional Patent Application No. 61/752,525 filed on Jan. 15, 2013. The contents of said applications are incorporated by reference herein.

FIELD OF INVENTION

The invention relates generally to dispensing equipment, such as a feed dispenser for agricultural use. In particular, the invention relates to a dispenser that discharges loose, pourable granular material such as feed from a hopper or other container by gravity and which provides a constant supply of dispensed material accessible outside the dispenser, for example so that a constant supply of feed is available to an animal.

BACKGROUND

Dispensers that are designed for dispensing animal feed and other loose, pourable granular material may comprise a hopper or other container for retaining a supply of feed and an outlet for dispensing feed from the hopper in a controlled fashion. Such systems have widespread use in many areas—for example in animal husbandry such systems are useful for releasing feed in a controlled fashion into a feed trough via gravity. One such system maintains a constant supply of feed in the trough wherein the feed that is removed by an animal is constantly replaced from the hopper. Examples of such systems are described in U.S. Pat. No. 6,923,142 and the references cited in said patent. Such systems permit a relatively large amount of feed to be stored in the hopper, where it can be located above the ground surface and can be protected against moisture, vermin and other adverse conditions. The system allows for on-demand feeding by maintaining a relatively small amount of feed available to the animal at all times.

In such systems, it is desirable to provide a means to accommodate different types of feed having, for example, different particle sizes or other physical characteristics. An on-demand feeder of the type described above typically comprises a hopper or other bulk storage container with a slot or other opening at its base to dispense contents by gravity flow. The feed is deposited onto the surface of a shelf or trough located below the opening which is exposed for access by the animal. The feed piles up in a mound on the exposed feed surface where it can be accessed by the animal. The mound continues to grow as feed is released from the outlet until the top of the mound reaches the outlet, which blocks further feed from being discharged. As feed is removed from the feed surface, for example as it is consumed by an animal, the mound lowers which then permits additional feed to be released from the outlet. In this fashion, the system is maintained in a steady state wherein feed that is removed from the surface is automatically replenished until the hopper is empty.

In systems of this type, the spacing between the feed surface and the hopper outlet can be a key factor in the efficacy of the system. If this spacing is too great, the mound will become too large for the trough or shelf to hold and will overflow the feed surface before the top of the mound reaches the hopper outlet, with the result that the hopper will be quickly emptied as the feed spills off the surface. If the spacing is too small, then the outlet will be blocked without forming a sufficient mound on the surface; feed will be unable to exit the outlet and/or the animal will be unable to access the feed on the surface. It will be seen that the appropriate spacing depends on several factors including physical characteristics of the feed, which determines the angle of repose of the mounded feed and the configuration of the underlying surface which determines the size of the mound that can be deposited thereon.

Means have been disclosed in the prior art relating to gravity feed systems of the type described above to permit adjustment of the spacing between the hopper outlet and the underlying shelf. U.S. Pat. No. 6,923,142 describes a system having a floating shelf suspended from straps that can be raised or lowered to adjust this spacing. The straps are each engaged to a rotatable plate wherein raising or lowering of these straps is accomplished by rotating the plate such that rotational movement of the plate is translated into vertical movement of the strap. When the shelf is placed in its desired position, the rotatable plate is locked against further rotation by engaging a toothed portion of the plate with a static component that has complementary teeth. This arrangement results in the spacing between the hopper outlet and the shelf to be adjusted in discrete increments proportional to the configuration of the mating teeth.

Systems disclosed in the prior art suffer from several drawbacks. One such drawback is that in order to adjust the shelf spacing, the mating teeth of the adjustment member must be disengaged, which causes the full weight of the feed-bearing shelf to be borne by the operator until the teeth can be re-engaged in the new position. This makes adjustment difficult, especially for one-handed operation. As a result of this and other drawbacks, there is a need for an improved animal feed dispenser in which the spacing between the container outlet and the underlying shelf can be controlled in a highly adjustable fashion that is easy to use while minimizing the risk of slippage.

SUMMARY OF THE INVENTION

According to a broad aspect, the invention relates to a dispenser for animal feed or other pourable granular material in which the material is dispensed as a mound; in the case of an animal feed dispenser, the material may be dispensed as a mound for consumption by the animal. According to this aspect, the invention comprises:

a dispenser body;
 a container for the granular material mounted to the dispenser body having an outlet for discharging the material by gravity feed onto a surface. The outlet is positioned above the surface wherein a gap is defined between the outlet and the surface to permit the material to accumulate beneath said outlet as a mound;
 at least one adjustable member coupled to the container or dispenser body which is moveable relative to the container along a path for varying said gap to control the volume of material that is dispensed from the container; and
 an actuator comprising an actuator body coupled to said adjustable member and configured to adjust the position thereof when said actuator body is moved and a friction member configured to apply a frictional force to the actuator body to restrict movement thereof whereby overcoming said frictional force permits adjustment of the position of the adjustable member to selectively vary said gap.

The actuator body can be engaged to the dispenser body for movement relative thereto.

In one aspect, a linkage arm can be coupled to said actuator body and said adjustable member to translate movement of said actuator body into travel of the adjustable member relative to the container. In one embodiment, rotational movement of the actuator body is translated in linear movement of the linkage arm, which moves the adjustable member in a linear path to selectively vary the gap. In this embodiment, the actuator body is a cam member that is rotatable relative to said dispenser body about an axis, said actuator further comprising a biasing member to urge said friction member against said cam member to provide frictional anti-rotation means acting on said cam member, said linkage arm being connected to said cam member whereby rotation of said cam member is translated into linear travel of said linkage arm.

The friction member may comprise first and second clamp members on opposing sides of said cam member to clamp said cam member therebetween and said biasing member is configured to urge said clamp members together to bear on said cam member. In this aspect, the cam member may comprise a rotatable plate and said clamp members comprise plates positioned on opposing sides of said rotatable plate for contacting said rotatable plate to apply a frictional anti-rotation force thereto.

The cam member may further comprise a connector projecting laterally therefrom offset from the axis of rotation of said cam member wherein rotation of said cam member about said axis is translated into an orbital movement of said connector about said axis, wherein said connector engages said linkage arm within a slot in said linkage arm to translate rotation of the cam member into linear travel of the connector.

The dispenser may further comprise an indexing member adjacent to the cam member comprising indicators for alignment with a handle which is provided to rotate the cam member, wherein when aligned said indicators corresponding to predetermined spacing between said shelf and said outlet.

In one aspect, the adjustable member comprises a shelf having an upper face that defines said surface, wherein elevating said shelf reduces said gap and lowering said shelf increases said gap.

In another aspect which is an alternative to the moveable shelf, the adjustable member comprises a moveable extension of said dispenser body adjacent to said outlet, such as a pair of extendible lips on opposing sides of the outlet, that extend towards said surface wherein extending said extension reduces said gap and retracting said extension increases said gap.

According to a further aspect, the invention relate to an assembly for mounting to a dispenser to control the outflow of pourable granular material from said dispenser, in which the dispenser comprising a dispenser body, a container for said material having an outlet for discharging material by gravity feed onto a surface wherein a gap is defined between said outlet and said surface to permit the material to accumulate beneath said outlet as a mound, and at least one adjustable member coupled to the container or dispenser body which is moveable relative to the container along a path for varying said gap to control the volume of material that is dispensed from the container. The assembly comprises the actuator as described above which is configured for engaging the adjustable member to the dispenser body or container. The assembly may optionally include the additional elements described in paragraphs 0015 to 0020 above.

The invention will now be further described by reference to specific embodiments. The invention is not limited to the preferred or exemplified embodiments of the invention described herein.

In the present description, directional references such a "vertical", "horizontal" and the like are generally provided purely for convenience of description. It will be understood that these terms are not intended to be applied strictly, and the invention may depart therefrom to be used in or include a range of orientations and the like. As well, any dimensions or references to specific materials herein are likewise not intended to limit the scope of the invention. It will also be appreciated that while the embodiments described herein relate to animal feed systems, in some aspects the invention is not limited to such systems but can include systems and apparatus that serve other functions.

The terms "feed" and "animal feed" broadly refer to any loose pourable granular material that can be dispensed to animals, including without limitation feed supplements, veterinary preparations, conventional animal feed and other matter.

"pourable material" refers to a solid material that is in a divided form such as granular form, which is capable of fluid behaviour such as being pourable from an outlet.

DETAILED DESCRIPTION

The embodiments described herein have specific application to animal feed dispensers for agricultural use. However, it will be evident to those skilled in the art that the present invention may be adapted to dispensers useful for a wide range of applications including both agricultural and non-agricultural uses, wherein a loose, flowable granular material is dispensed from a hopper or other container. The material may be dispensed onto a surface in the form of a mound.

Figure 1:
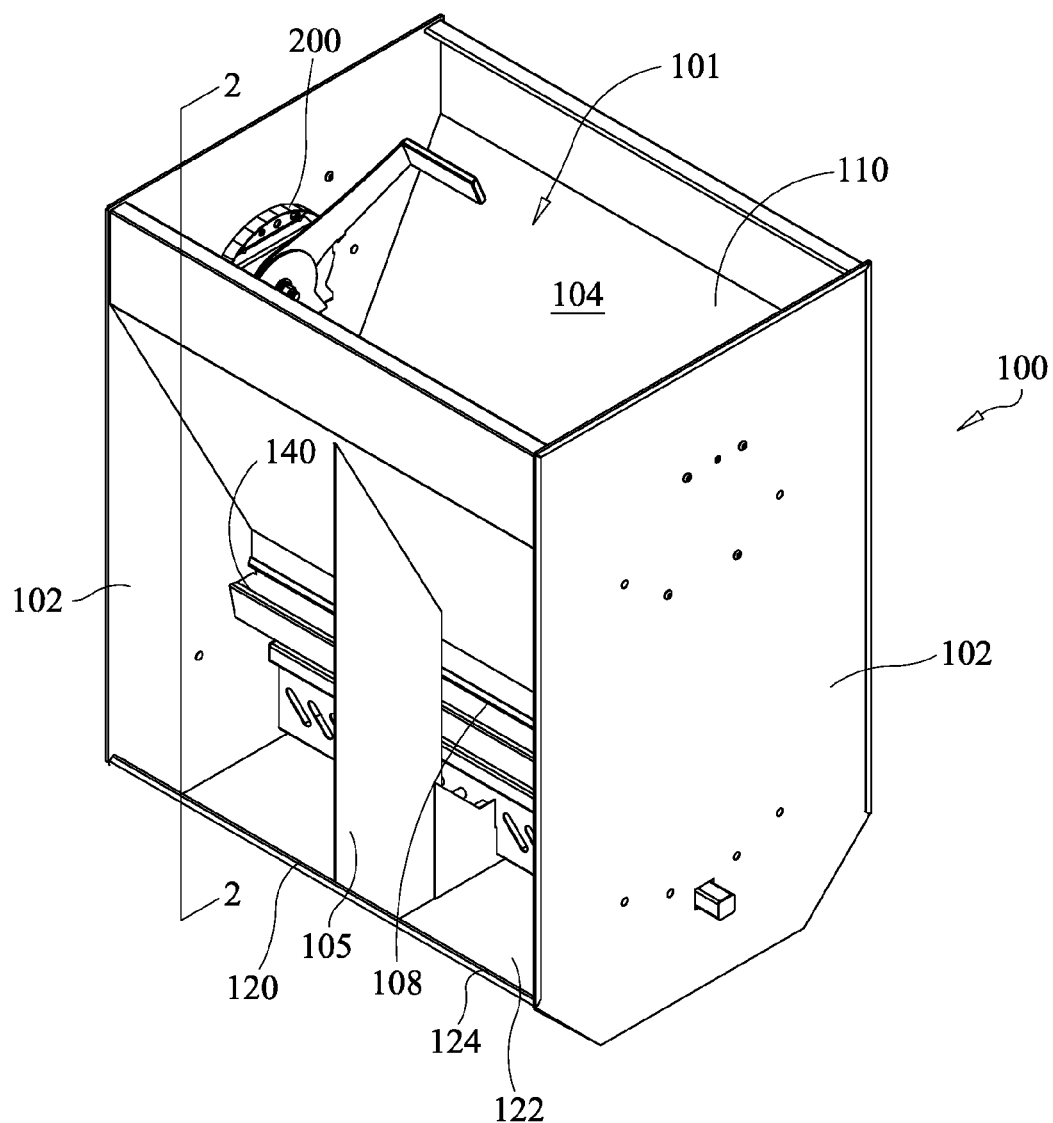
FIG. 1 is a perspective view of an embodiment of the dispenser according to the present invention, consisting of an animal feeder.
Figure 2A:
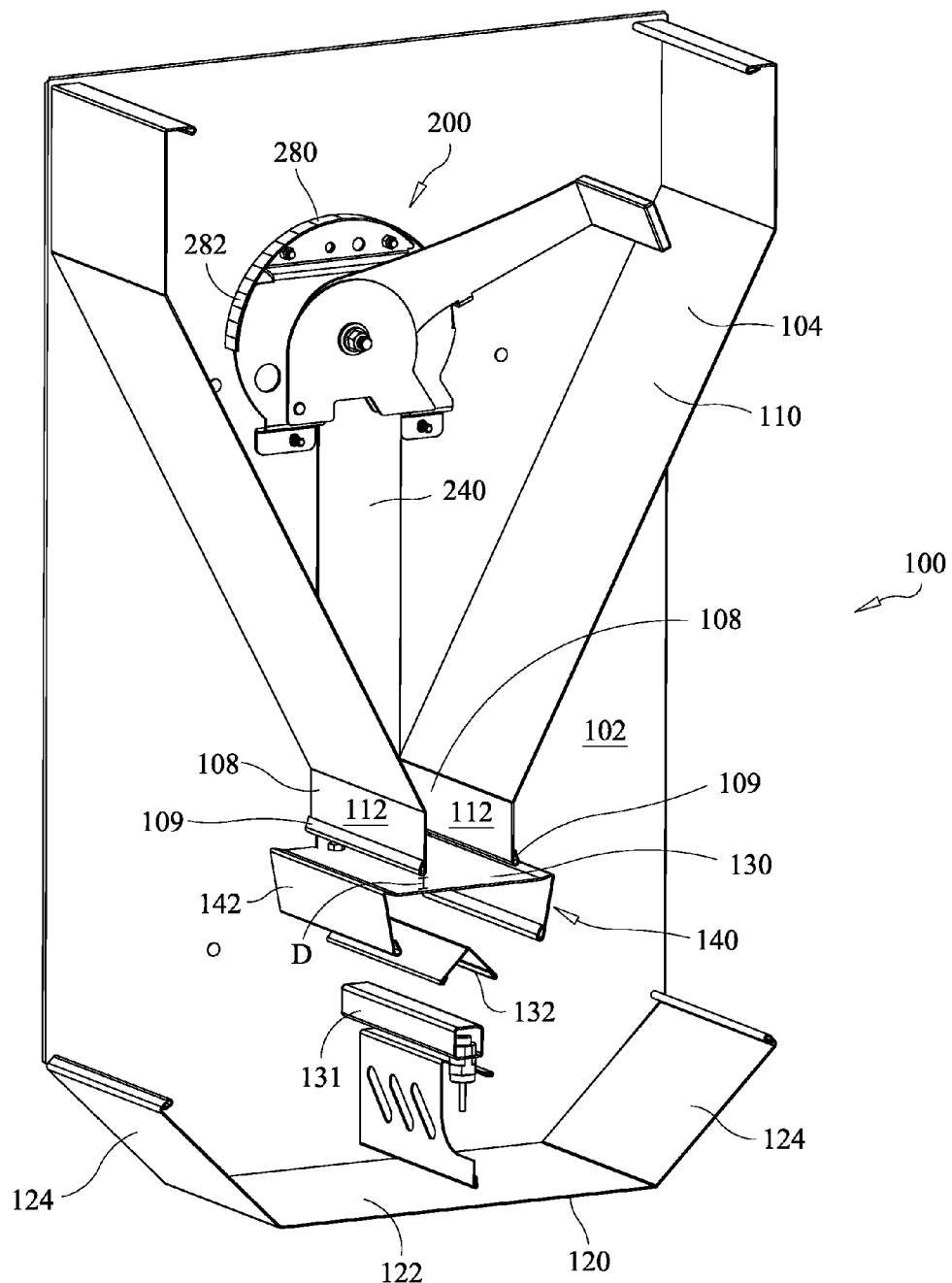
FIG. 2A is a view in perspective of a cross-section of the feeder along line 2-2 of FIG. 1.
Figure 2B:
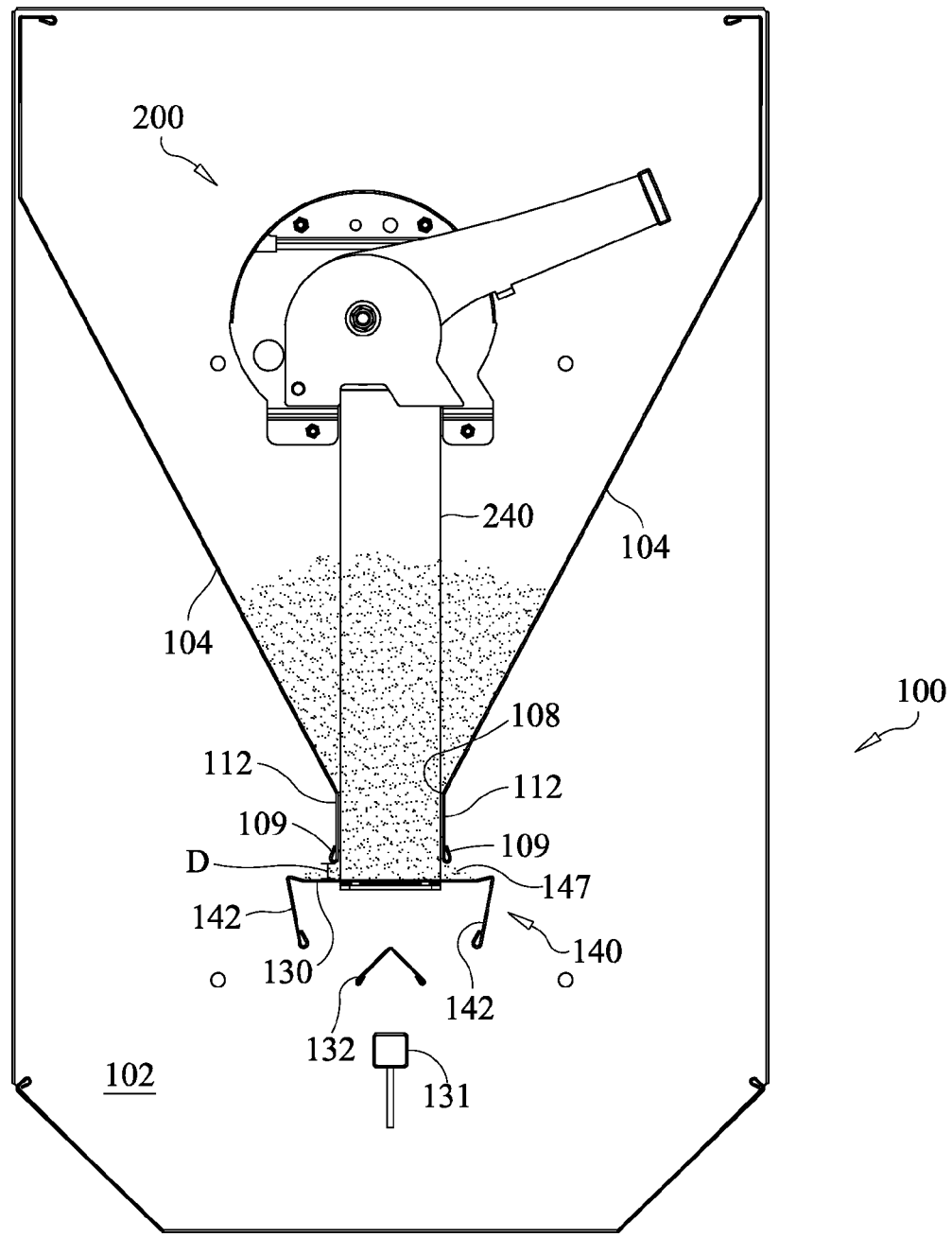
FIG. 2B is a cross-sectional view of the feeder along line 2-2 of FIG. 1.
Figure 3:
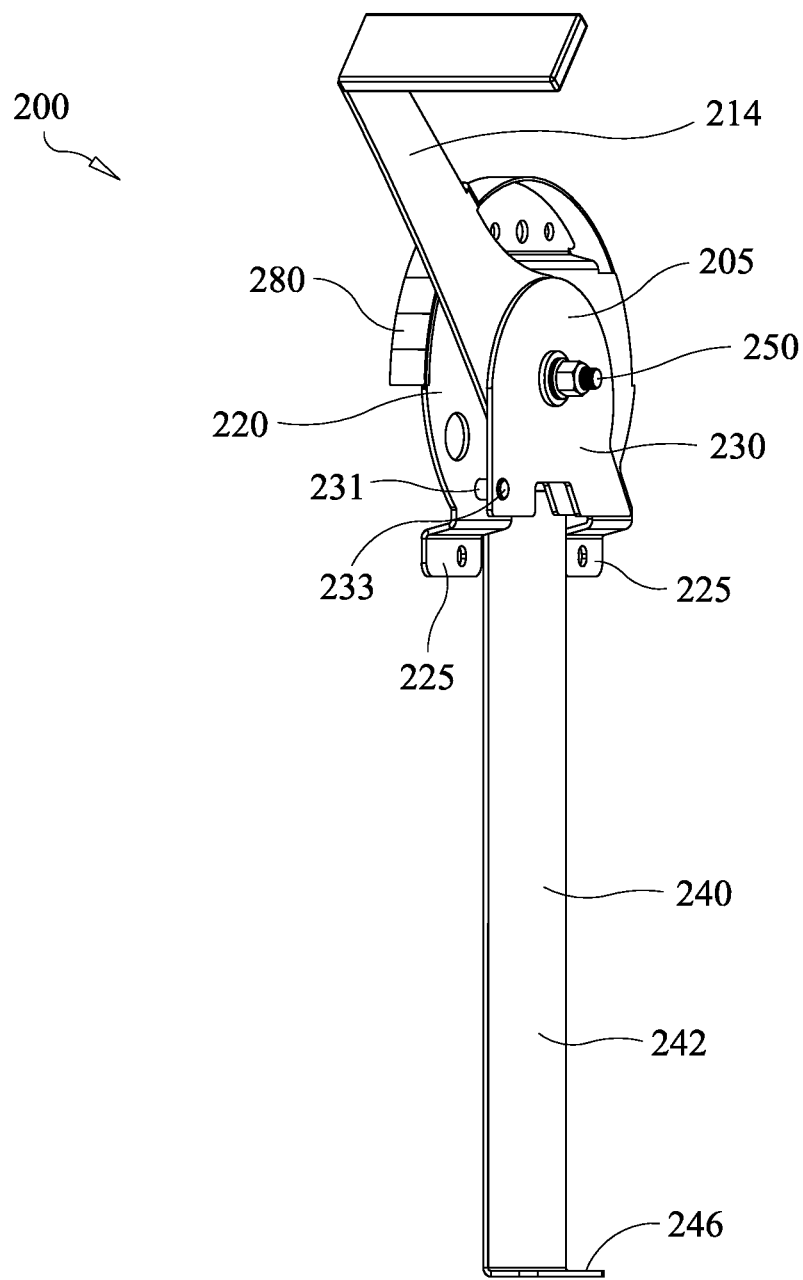
FIGS. 3 and 4 are perspective views of the control assembly of the feeder.
Figure 4:
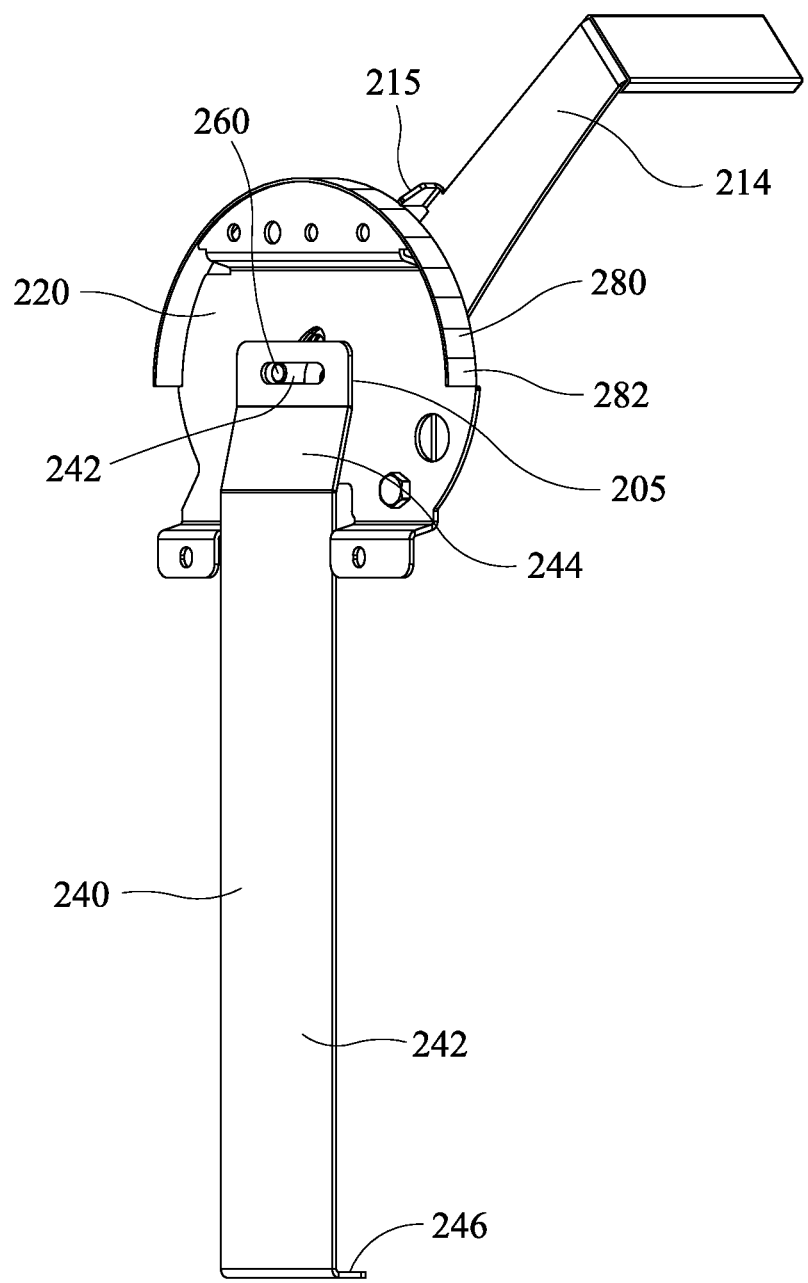
Figure 5:
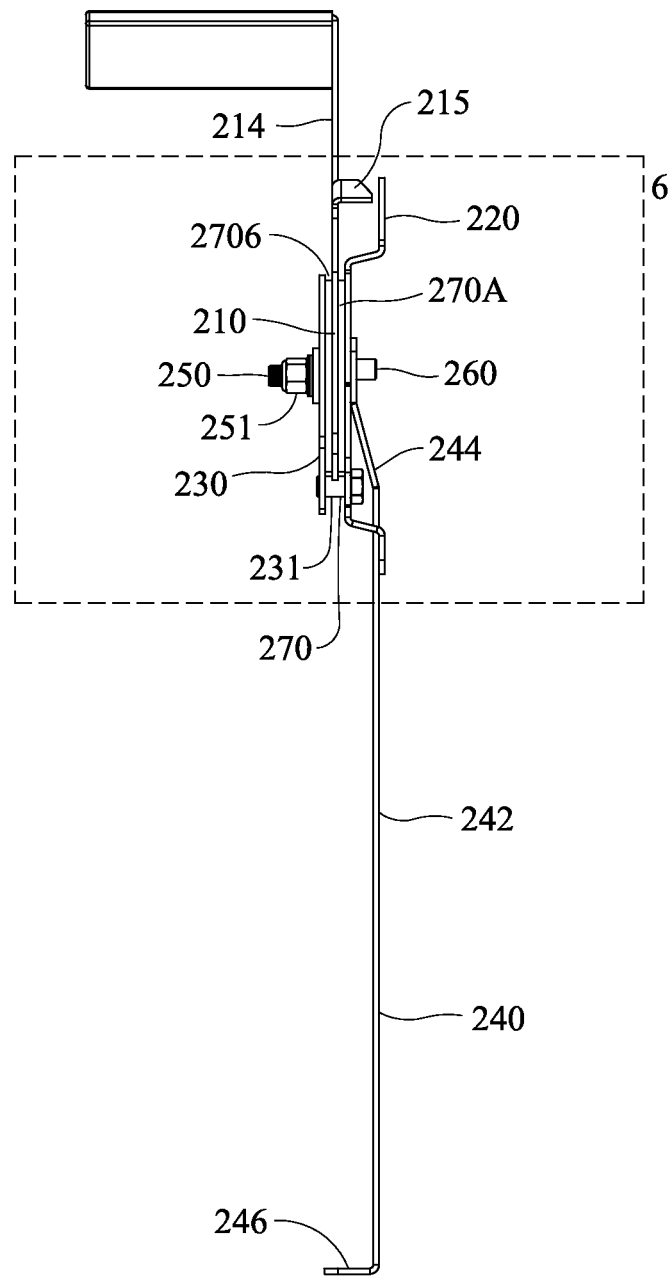
FIG. 5 is a side elevational view of the control assembly.

FIGS. 1, 2A and 2B depict an animal feeder 100 for dispensing loose feed in granular form such as feed pellets, grain, silage or any other feed that is capable of flowing under the influence of gravity through an opening and forming a heaping mound when deposited on a flat surface.

Feeder 100 comprises an open top 101 and vertical end walls 102 that define opposing end surfaces thereof. The upper portion of feeder 100 comprises a hopper 110 defined by sidewalls 104 extending between end walls 102. Sidewalls 104 are supported by buttresses 105 on opposing sides of feeder 100 intermediate between end walls 102. Sidewalls 104 converge towards the base of hopper 110 to form an elongate slot 108 that extends the length of hopper 110 and forms the outlet of hopper 110. Slot 108 is defined by opposing vertical portions 112 of walls 104 that define a vertical channel, terminating in opposing lips 109 that form the lower margins of sidewalls 104. The width of slot 1008 is typically about 3 inches, although this dimension is variable depending on the intended use of feeder 100 wherein feed or other loose matter is able to flow via gravity feed through slot 108. It will be seen that hopper 110 may be replaced with any suitable container such as a closed-top container if conditions require such an arrangement.

Material flowing out of hopper 110 is discharged onto a surface in the form of a mound. The volume of material that can be discharged is determined by the size of the mound, which in turn is dictated by the gap between the hopper outlet and the discharge surface. Feeder 100 includes an adjustable member that permits the operator to vary this gap size to thereby control the volume of material that is discharged from the hopper. In the first example described herein, the adjustable member consists of a shelf 140 that can be vertically adjusted to vary the gap between the hopper outlet and the shelf surface, as described below. Alternatively, the adjustable member can vary this gap by other means to control material outflow, as described below in conjunction with FIG. 11.

The lower portion of feeder 100 comprises a trough 120 enclosed by end walls 102 and further defined by a floor 122 and upwardly diverging sidewalls 124. Trough 120 retains food that overflows the shelf, described below, and water that is dispensed into the trough. Trough 120 is located below hopper 110 and spaced apart from hopper 110 by a gap. Floor 122 can rest on a surface such as an animal pen to provide access at ground level to an animal. Although the feeder 100 is a unitary structure, it will be understood that trough 120 and hopper 110 also can be separate structures.

The shelf 140 is located below slot 108 in the gap between hopper 110 and trough 120. Shelf is 140 is located such that feed exiting slot 108 is deposited onto shelf 140. Shelf 140 is free floating within feeder 100 whereby it can be elevated or lowered within feeder 100 within a limited vertical range to vary the spacing between shelf 140 and slot 108, as will be described below. Shelf 140 comprises a floor 130, end walls 132 adjacent to end walls 102 and downwardly-extending sidewalls 142 for rigidity. The lateral edges of floor 130 may be slightly upturned to retain feed thereon. Shelf 140 serves as the primary repository of feed exiting hopper 110, wherein feed accumulates in a mound on shelf 140 for consumption by an animal. Any feed that is dislodged from shelf 140 accumulates within lower trough 120 where it may also be consumed.

A water pipe 131 extends lengthwise within feeder 100 beneath shelf 140 to dispense drinking water into trough 120. Pipe 131 is connectible to a source of water, not shown, and includes one or more animal-activated nozzles or nipples of conventional design. A brace 132 may also extend lengthwise within feeder 100 to provide additional support.

Feed that exits through slot 108 accumulates as a mound 147 on shelf 140. Feed is discharged continuously from slot 108 under the influence of gravity, and the discharge only stops when mound 147 reaches slot 108 and obstructs further flow. Assuming that the vertical position of the shelf has been correctly set, mound 147 is retained wholly on shelf 140 unless the feed is dislodged by an animal. The maximum height of mound 147 is thus the distance from floor 130 of shelf 140 and lips 109 of slot 108. When the mound reaches this height, slot 108 is blocked and no further feed can be discharged from slot 108. The slope that can be attained by the mound depends on the characteristics of the feed, which provides an angle of repose of mound 147. In order to retain mound 147 on shelf 140 without overflowing, the mound must be wholly retained on shelf 140. As the feed on shelf 140 is consumed or knocked off by an animal, it is replaced by additional feed flowing through slot 108.

The width of shelf 140 between its later edges is about 6 inches.

The spacing between lips 109 and floor 130 is shown in FIGS. 2A and 2B as distance "d", which can be adjusted by elevating or lowering shelf 140 to thereby provide the optimal height of mound 147 for a given shelf configuration and feed type. Distance "d" is normally between 0 and 1.5 inches.

The height attainable by mound 147 without overflowing shelf 140 depends on several variables. These include the physical properties of the feed, the width of floor 130 and the distance "d" between floor 130 and lips 109 of outlet 108. Relevant physical properties of the feed can include the particulate size (or mean particulate size) as well as the shape and surface properties of the particulates: particulates with a smaller size, a relatively low coefficient of friction and a more spherical shape will tend to flow more easily and require a smaller spacing "d" than those that are larger, less spherical and with a higher surface friction co-efficient. The required spacing is normally determined by trial and error, but this information can also be supplied by the feed supplier.

It will be seen that if distance d is too great for a particular feed type, mound 147 will be too high for its angle of repose and the feed will overflow shelf 140. If d is too small, the flow of feed will be blocked from flowing out of outlet 108 and/or mound 147 will be so small as to be inaccessible to an animal.

Figure 10:
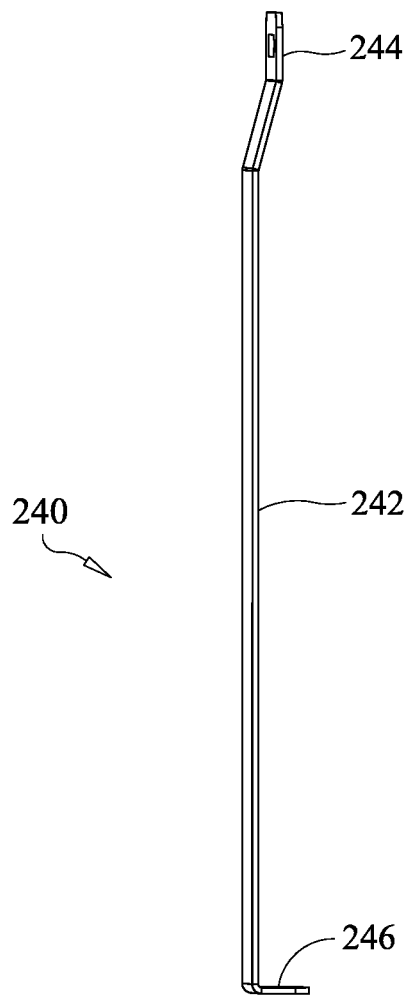
FIG. 10 is a side elevational view of the linkage arm.

Shelf 140 is supported by a pair of vertically-oriented elongate linkage arms 240 located on opposing sides of feeder 100 within hopper 110 adjacent to the corresponding interior surfaces of end walls 102. Arms 240, one of which is shown in side view of FIG. 10, each comprise an elongate link member such as a rigid strap or band that can support shelf 140. Arm 240 is mounted for vertical travel, as discussed below, to raise or lower shelf 140 to adjust spacing "d". Each arm 240 comprises a flat elongate body 242, an offset upper portion 244 and a projecting tab 246 at its bottom end that extends at a right angle from body 242. Arm 240 can be approximately 3" wide.

A portion of arm 240 is confined for travel within slot 108 of hopper 110. Arms 240 are each configured to fit snugly within slot 108 whereby vertical travel is substantially unobstructed, but side to side movement is restricted to ensure that arm 240 is confined to vertical travel.

Tabs 246 project inwardly towards each other. Shelf 140 is secured to tabs 246 whereby tabs 246 support shelf 140 and vertical travel of arms 240 conveys shelf 140 vertically.

As shown in more detail in FIGS. 3-9, vertical travel of each arm 240 is actuated by a corresponding actuator 200 mounted to an interior surface of end wall 102. Feeder 100 comprises pair of actuators 200 on opposing end walls 102 for elevating opposing ones of arms 240 for elevating or lowering respective sides of shelf 140.

Figure 8:
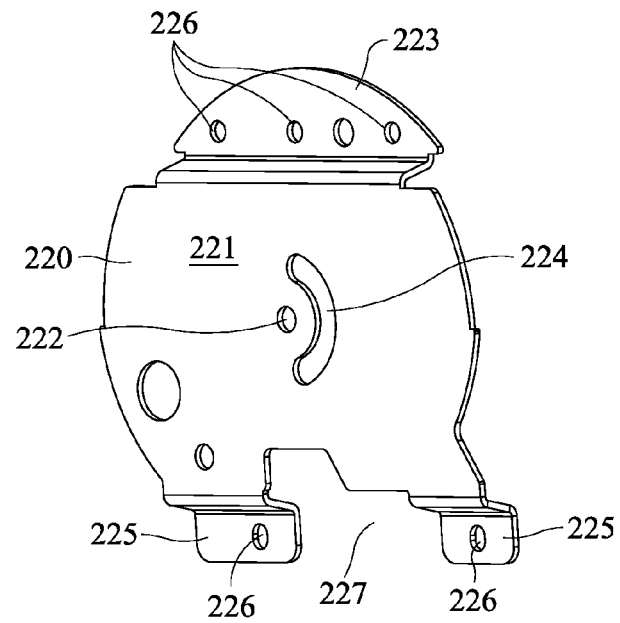
FIG. 8 is a perspective view of the lever plate of the control assembly.
Figure 9:
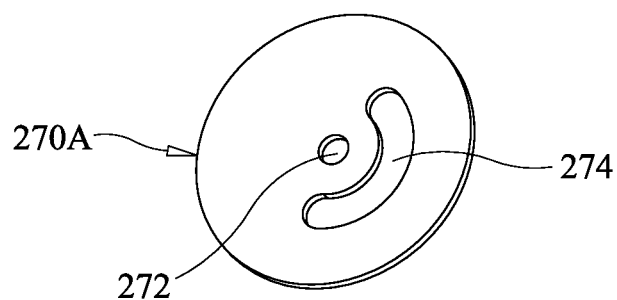
FIG. 9 is a perspective view of the friction pad of the control assembly.

Actuator 200 comprises a base plate 220, seen in more detail in FIG. 8, which is bolted or otherwise secured to the interior face of end wall 102. Plate 220 comprises a flat central portion 221, an offset upper portion 223 for contacting end wall 102, and a pair of feet 225 at the lower portion of plate 220. Feet 225 project in the same direction as portion 223 for contacting end wall 102 wherein central portion 221 is spaced apart from end wall 102 to leave a gap therebetween. Feet 225 are spaced to leave a slot 227 therebetween. Arm 240 projects upwardly through slot 227 into the gap between central portion 221 and end wall 102. Plate 220 can be fastened to end wall 102 by screwing or bolting offset portion 223 and feet 225 to end wall 102.

Figure 7:
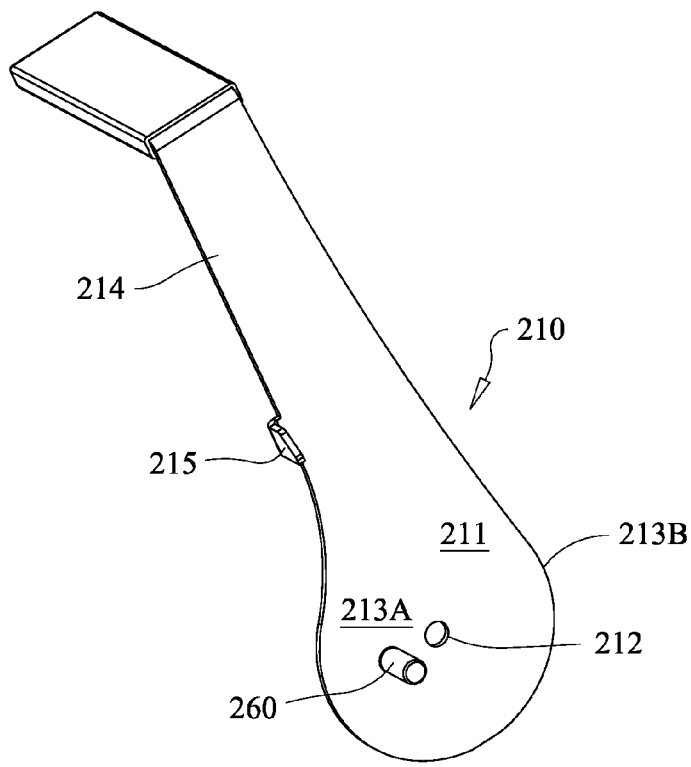
FIG. 7 is a perspective view of the lever arm of the control assembly.

Actuator 200 further comprises a cam plate 210 secured to base plate 220, shown in detail in FIG. 7. Cam plate 210 comprises a generally disk-shaped body 211 and a handle 214 projecting radially from body 211 which permits a user to rotate plate 210. Handle 214 is relatively long to apply sufficient leverage acting on cam plate 210 for relatively easy manual rotation of said cam plate 210. It will be seen that alternative torque-applying means may be substituted such as a motor or other form of hand-actuated rotator. Plate 210 is mounted to base plate 220 and is rotatable journalled on a pin 250 that forms an axis of rotation of plate 210.

A lift pin 260 projects axially from plate 210 from a position offset from the axis of rotation of plate 210 wherein rotation of plate 210 is translated to orbital movement of pin 260. Pin 260 effectively forms a connector between cam plate 210 and arm 240 that translates rotation of cam plate 210 into vertical travel of arm 240. Pin 260 projects through arcuate slot 224 in base plate 220 into the gap between plate 220 and end wall 102.

Arm 240 comprises a horizontally-disposed slot 242 adjacent its upper end extending through offset upper portion 244 of arm 240. Pin 260 projects through slot 242 for horizontal travel therein. Pin 260 thus engages arm 240 to cam plate 210 whereby rotation of plate 210 is translated into vertical travel of arm 240. Slot 242 permits pin 260 to travel horizontally as pin 260 follows a circular path without urging arm 240 sideways, to allow the vertical component of the movement of pin 260 to be translated into vertical travel of arm 240. Confinement of arm 240 within slot 227 prevents horizontal displacement to limit movement of arm 240 to vertical travel, particularly in cooperation with the confinement of a lower portion of arm 240 within slot 108.

It will be seen that the amount of offset of lift pin 260 from the axis of rotation of plate 210 will determine the amount of rotation of plate 210 required to elevate shelf 140 by a selected amount. Reducing the offset of pin 260 relative to this axis increases the leverage that may be applied to plate 210, thereby requiring more travel of handle 214 to effect a given vertical travel of shelf 140. Preferably, the spacing is set such that approximately 180 degrees of rotation of handle 214 provides a full range of travel of shelf 140 that is suitable for most uses.

A cowl 280, seen in FIGS. 2a and 2b protrudes from end wall 102 to surround an upper portion of base plate 220. Cowl 280 comprises an arcuate plate that is semicircular in cross section. Cowl 280 has evenly spaced numerical, alphabetical or other markings 282 thereon to provide a convenient means to position handles 214 in a repeatable fashion, whereby like markings 282 on respective actuators 200 correspond to the same distances "d" on the respective sides of feeder 100. The markings can be calibrated to show the actual measurement of distance d or may comprise arbitrary markings.

Markings 282 are on the upper surface of cowl 280 for visibility from overhead of feeder 100. Markings 282 can be aligned with an indicator on handle 214 to provide a guide for adjusting shelf 140, whereby alignment of handle 214 with a selected marking 282 correlates with a particular spacing "d" of shelf 140. In one embodiment, markings 282 extend over an approximately semicircular arc along cowl 280, to correspond with a maximal 180 degree range of rotation of handle 214. It will be seen that the rotational range of travel of handle 214, as well as markings 282, may vary; the example herein represents merely a convenient selection of one such range. A relatively wide spacing of markings 282, across a relatively broad arc, provides quick and accurate setting of actuator 200, while more markings, closely spaced, can make it easier to provide finer measurable adjustment.

As an alternative to markings on the cowl, calibrated markings can be placed on cover plate 230, which can be aligned with a corresponding marker handle 214.

Actuator 200 further comprises an outermost cover plate 230. Cover plate 230 is retained to base plate 220 by a central mount shaft 250. Rotation of plate 230 on shaft 250 is prevented by one or more pins 231 which protrude from base plate 220 and are received within openings 233 within cover plate 230 (see FIG. 3). Pins 231 can slide freely within openings 233 to permit horizontal travel of plate 230 to thereby permit cover plate 230 to be urged towards base plate 220.

Cam plate 210 is thus sandwiched between base plate 220 and cover plate 230. The respective configurations of plates 220, 210 and 230 provide disk-shaped portions of the respective plates that are similar in configuration whereby the three plates effectively form an aligned stack. Cam plate 210 is rotatable about a central axis while the outer plates 220 and 230 remain static. As discussed herein, rotation of cam plate 210 is translated into vertical travel of arm 240. Plates 220 and 230 frictionally engage plate 210 to resist rotation until this is overcome by a sufficient countervailing torque applied by a user.

Figure 6:
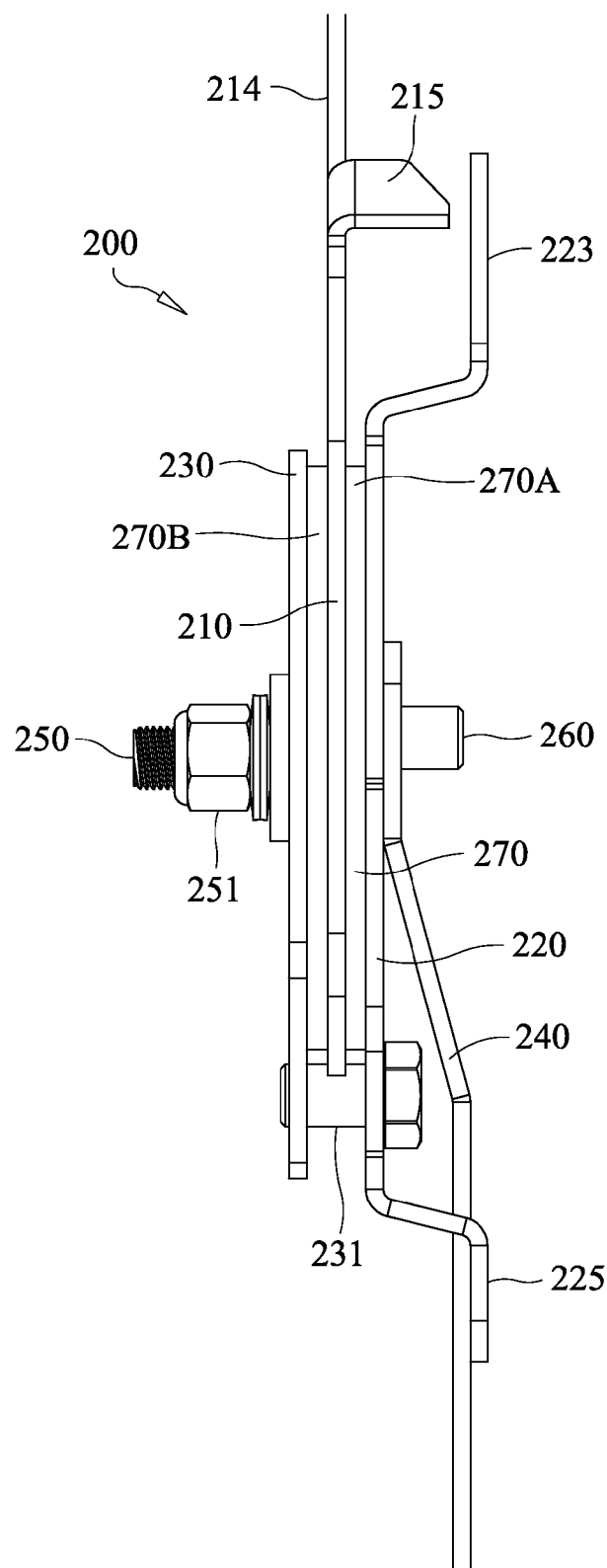
FIG. 6 is a detailed view of the region of FIG. 5 within the area marked "6".

Direct contact between the respective plates is prevented by inner and outer friction pads 270a and 270b respectively located on opposing sides of plate 220, as seen in more detail in FIG. 6. Friction pads 270a and 270b may comprise discrete pads or a coating or layer on the surfaces of any of plates 220, 210 or 230. Friction pads 270a and b may comprise any suitable material such as a synthetic material that is suitable for generating sufficient friction to prevent rotation of cam plate 210 when handle 214 is released. Friction pads 270a and 270b protect the respective metal plates against wear and provide sufficient friction to permit rotation of cam plate 210 when handle 214 is firmly moved, while preventing rotation when handle 214 is released during normal use of feeder 100. Inner friction pad 270a also has an arcuate slot 274 aligned with slot 224 to allow lift pin 260 to travel therethrough.

The respective plates 220, 210 and 230, as well as friction pads 270a and 270b, are retained together by central mount shaft 250. Shaft 250 is welded to base plate 220 to protrude horizontally through the respective plates and pads that comprise actuator 200. Shaft 250 protrudes through aligned apertures within plates 210 and 230 as well as friction pads 270a and b. Shaft 250 may comprise a bolt that is threaded either at its distal end or along its full length and the respective plates and pads are retained thereon with a tightening member such as nut 251. Nut 251 can be tightened against the respective plates and pads to clamp cam plate 210 between plates 220 and 230 to thereby frictionally engage plate 210 to restrict its rotation. Nut 251 may be tightened or adjusted as the need arises, for example to accommodate use of the system with different types of animals or following excessive wear. One or more bubble or spring washers, not shown, are provided on shaft 250 to maintain even compression as components experience normal wear. Cam plate 210 is rotatable about shaft 250, which thus effectively provides the axis of rotation for this plate.

In operation, nut 251 is tightened on shaft 250 to bear on outer plate 230, thereby compressing outer plates 230 and 220 against cam plate 210. This increases the frictional resistance against rotation of cam plate 210. The clamping force on plate 210 may be set at a level where handle 214 requires a moderate degree of rotational force to rotate cam plate 210—the appropriate amount of tightening against plate 210 will depend on to some extent on the use of the feeder 100. Use of the feeder 100 for large and strong animals may require a higher setting. Rotation of handle 214 applies torque for rotation cam plate 210, which in turn lowers or elevates arm 240 depending on the direction of rotation, to accommodate different feed types. The degree of rotation is limited by slot 224 which limits the travel of pin 260. Elevation or lowering of arm 240 effects a corresponding elevation or lowering of shelf 140. The user can adjust each side of shelf 140 by making identical adjustments to the respective actuator mechanisms 200 on the opposing sides of feeder 100. The markings on cowl 280 permit the user to evenly adjust the respective sides. When shelf 140 is at a desired elevation, the frictional resistance generated by the clamping action of plates 220 and 230 against cam plate 210 prevents slippage of arm 240. The desired elevation can be set by trial and error, or alternatively a guide may be provided which estimates the appropriate elevation for particular feed types.

Frictional engagement of cam plate 210 by plates 220 and 230 applies a constant countervailing force against rotation of plate 210 including during adjustment of shelf 1400. Cam plate 210 is at no time required to be fully disengaged from plates 220 and 230 to permit adjustment of shelf 140. As a result, actuator 200 supports the weight of shelf 140 and resists its downward slippage during the adjustment process. During adjustment of shelf 140, rotation of handle 214 in either direction requires sufficient force to overcome the frictional resistance acting on plate 210, but does not require that the full weight of shelf 140 be borne by the user during the adjustment process.

Figure 11:
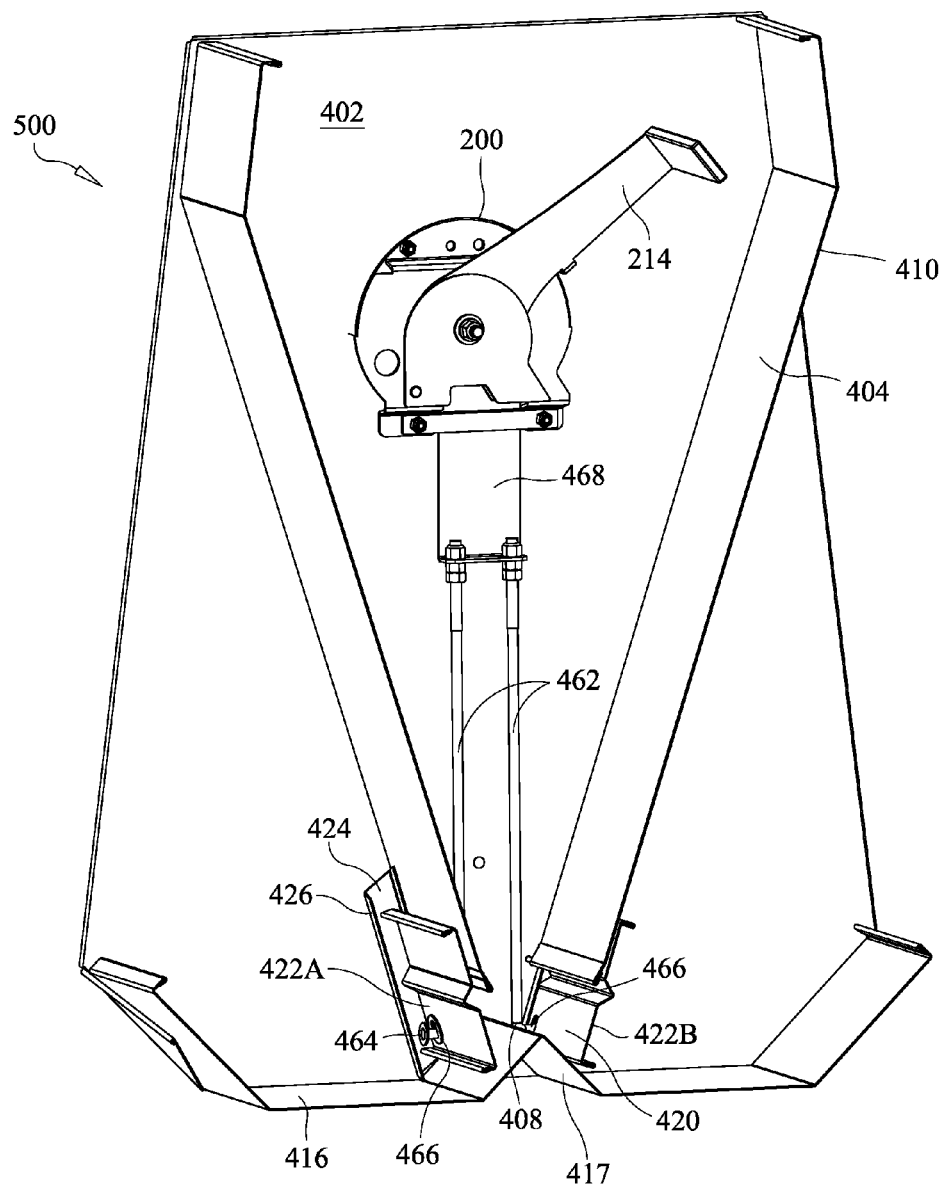
FIG. 11 is a perspective view of a second embodiment of the dispenser, showing a portion thereof.
Figure 12:
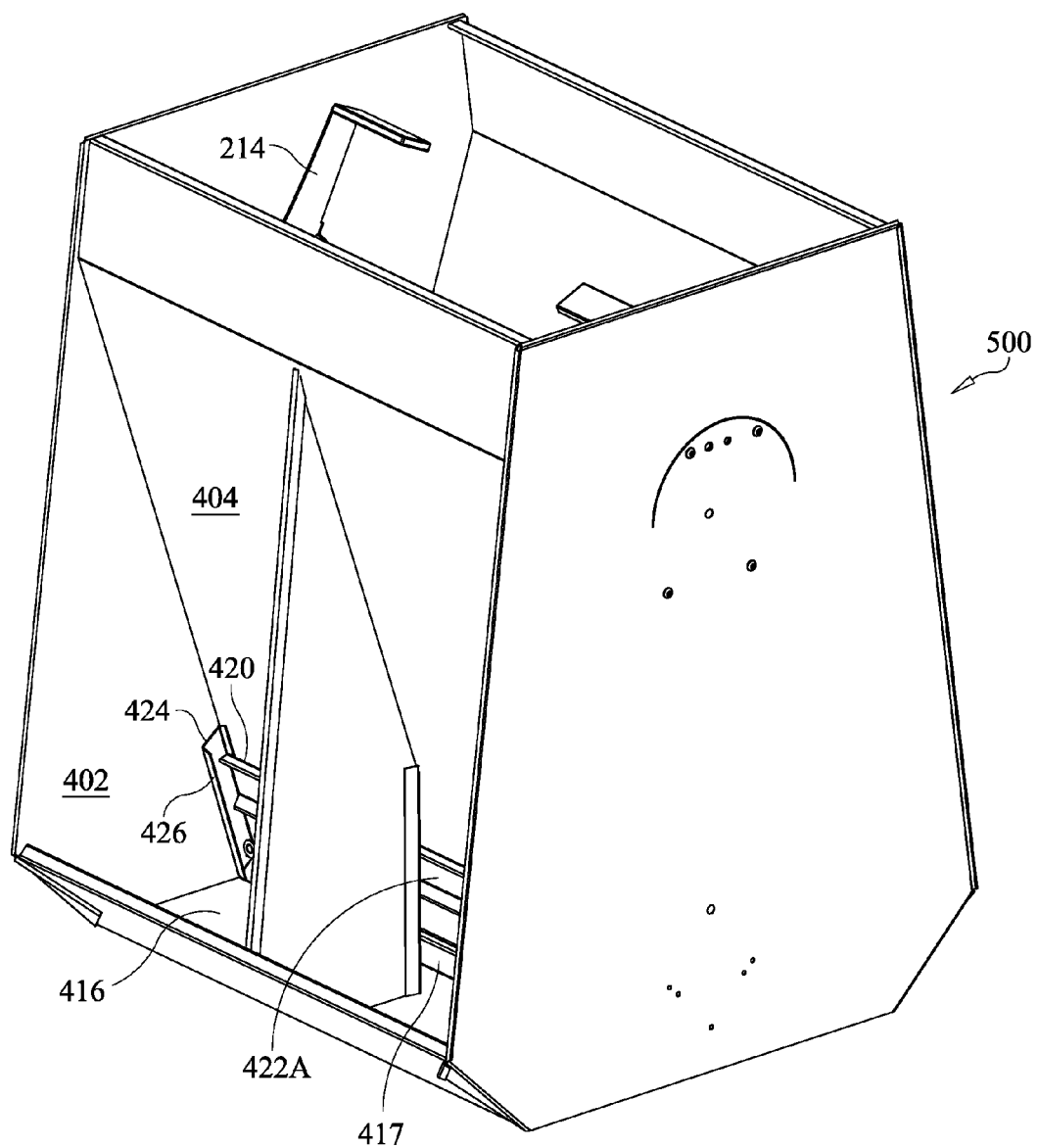
FIG. 12 is a further perspective view of the second embodiment.

FIGS. 11 and 12 show a second embodiment of a feeder 500 according to the invention. FIG. 11 shows a cutaway view of an end of feeder 500 and FIG. 12 shows the complete feeder 500. In this embodiment, the discharge surface that receives the mounded particulates is fixed in position and the gap between this surface and the gap is varied by varying the effective vertical position of the hopper outlet relative to the discharge surface. In this embodiment, feeder 400 is configured to provide a variable gap between the outlet slot 408 of hopper 410 and the discharge surface 416 that receives the discharged material by providing a selectively adjustable extension of the hopper outlet slot.

Hopper 410 is defined by side walls 404 and end walls 402. The gap between outlet slot 408 and discharge surface 416 is adjusted by means of an extension member 420 associated with outlet slot 408 of hopper 410. Discharge surface 416 comprises the floor of a fixed-position trough located at the base of feeder 400. A central ridge 417 protrudes upwardly from floor 416 towards slot 408, to direct feed towards the sides of floor 416 where it is accessible to an animal.

Extension member 420 consists of a pair of sliding plates 422a and 422b that form downwardly-extending lips located on opposing sides of slot 408. The lower edges of plates 422a and b are spaced above surface 416 to define a gap. Plates 422a and b are slideably secured to feeder 400 by engagement within vertical grooves 424 defined by flanges 426 that project from end walls 402. Plates 422a and b fit within opposing grooves 424 that face each other from opposing end walls 402. Sliding plates 422a and b upwardly within grooves 424 effectively increases the gap size between outlet 408 and discharge surface 416 while sliding plates 422 downwardly reduces this gap size. Grooves 424 diverge outwardly and upwardly so as to parallel sidewalls 404 whereby plates 422a and b can slide in generally vertical, upwardly diverging paths that parallel diverging sidewalls 404. Plates 422a and b thus define a channel having outwardly diverging sides and an open slot at the bottom for the outflow of material. Grooves 424 define the range of vertical travel of plates 422 wherein the upper and lower freedom of movement of plates 422 is bounded by the length of grooves 424.

Plates 422 can be elevated and lowered in tandem by means of control assemblies mounted to opposing ends of feeder 400. Each control assembly provides a pair of vertically moveable linkage rods 462. Rods 462 are oriented vertically and have a generally horizontally projecting feed 464 at their respective lower ends. Rods 462 are located between sidewalls 404 and their lower ends extend between plates 422. Feet 464 engage openings 466 within plates 422 whereby retracting rods 462 upwardly causes plates 422 to travel upwardly and extension downwardly causes plates 422 to travel downwardly. Feet 464 slide freely in a horizontal direction within openings 466 to accommodate the divergence of plates 422a and b as these plates travel upwardly. Feet 464 have a sufficient length to remain engaged within openings 466 within the full range of travel of plates 422 permitted by grooves 424.

The upper ends of rods 462 are engaged to a vertically-oriented rigid metal ribbon 468 and extend downwardly therefrom. Rods 462 and ribbon 468 together form a vertical linkage arm that can travel vertically to control the elevation of extension member 420. The vertical travel of ribbon 468 is in turn actuated by an actuator 200, which has the same configuration as the embodiment depicted in FIGS. 1-10 and which is mounted to the inside surface of end wall 402. The opposing end wall, not shown in FIG. 11, has an identical actuator 200 and linkage arm assembly connecting to extension member 420 from the opposing end thereof.

It will be apparent to those having ordinary skill in the art that certain adaptations and modifications of the described embodiments can be made, consistent with and without departing from the present invention. Unless otherwise indicated, the embodiments described in the invention shall be understood to be non-exclusive of each other such that any embodiment can include different features of other embodiments. Therefore, the above discussed embodiments are considered to be illustrative and not restrictive. Other embodiments consistent with the present invention will become apparent from consideration of the specification and the practice of the present invention taught and suggested herein.

The invention claimed is:

1. A dispenser for granular material comprising:
   a dispenser body comprising a container for said material, having an outlet for discharging said material by gravity feed,
   a shelf beneath said outlet wherein said shelf is mounted to said dispenser body for travel vertically relative to the container, said shelf being positioned to receive material from said outlet in the form of a mound,
   a linkage arm coupled to said shelf for adjusting the vertical position of said shelf, said linkage arm being moveably engaged to the dispenser body for travel between a first position wherein the shelf is elevated and a second position wherein the shelf is lowered, wherein elevating said shelf reduces the space between said outlet and said shelf and lowering said shelf increases said space,
   an actuator mounted to said dispenser body for rotation about an axis of rotation and coupled to said linkage arm whereby rotation of said actuator in a first direction displaces said linkage arm to said first position and rotation in an opposed second direction displaces said linkage arm to said second position, and at least one friction member in contact with said actuator configured to apply a frictional force against said actuator to restrict rotation of the actuator whereby the shelf is retained in a selected vertical position by frictional force, whereby the frictional engagement of the actuator applies a constant countervailing force against rotation thereof and prevents slippage of said shelf.

2. An assembly for mounting to a dispenser to control the outflow of granular material from said dispenser, said dispenser comprising a dispenser body including a container for said material having an outlet for discharging said material by gravity feed, and a shelf beneath said outlet wherein said shelf is mounted to said dispenser body for travel vertically relative to the container, said shelf being positioned to receive said material from said outlet in the form of a mound, said assembly comprising:

a linkage arm coupled to said shelf for adjusting the vertical position of said shelf, said linkage arm being engaged to the dispenser body for travel between a first position wherein the shelf is elevated and a second position wherein the shelf is lowered, wherein elevating said shelf reduces the space between said outlet and said shelf and lowering said shelf increases said space, an actuator for mounting to said dispenser body for rotation about an axis of rotation and coupled to said linkage arm whereby rotation of said actuator in a first direction displaces said linkage arm to said first position and rotation in an opposed second direction displaces said linkage arm to said second position, and at least one friction member in contact with said actuator configured to apply a frictional force against said actuator to restrict rotation of the actuator, whereby the shelf is retained in a selected vertical position by frictional force, whereby the frictional engagement of the actuator applies a constant countervailing force against rotation thereof and prevents slippage of said shelf.

3. The dispenser of claim 1, wherein said actuator comprises a plate having a surface for contacting said at least one friction member for frictional engagement therewith.

4. The dispenser of claim 3, wherein said at least one friction member comprises first and second friction pads on opposing sides of said plate to clamp said plate therebetween.

5. The dispenser of claim 1, wherein a first of said at least one friction members is mounted to said dispenser body and is configured to provide a space for said linkage arm to travel between the dispenser body and the first friction member.

6. The dispenser of claim 1, wherein said actuator further comprises a connector projecting laterally therefrom offset from the axis of rotation of said actuator wherein rotation of said actuator about said axis of rotation is translated into an orbital movement of said connector about said axis of rotation, wherein said connector engages said linkage arm within a slot in said linkage arm to translate rotation of the actuator into linear travel of the linkage arm.

7. The dispenser of claim 6 wherein said slot is horizontally oriented.

8. The dispenser of claim 1, wherein said container comprises a hopper.

9. The dispenser of claim 6, wherein a first of said at least one friction members is mounted to said dispenser body and is configured to provide a space for said linkage arm to travel between the dispenser body and the first friction member, and wherein said first friction member has an arcuate slot therein and said connector travels within said arcuate slot during rotation of said actuator, said slot limiting the travel of said connector to define upper and lower limits for travel of said shelf.

10. The dispenser of claim 5, wherein a second of said at least one friction members is mounted to said first friction member by a floating mount that prevents rotation of the second friction member while permitting linear travel of the second friction member for urging against the first friction member.

11. The dispenser of claim 1, further comprising a handle projecting from said actuator for rotation thereof.

12. The dispenser of claim 1, further comprising an indexing member adjacent to said actuator comprising indicators corresponding to predetermined spacings between said shelf and said outlet.

13. The dispenser of claim 1 further comprising a second of said actuator and a second of said linkage arm wherein the second actuator and second linkage arm are provided on an opposing side of said container from a first of said actuator and said linkage arm.

14. The dispenser of claim 2, further comprising a moveable extension member extending from said dispenser body adjacent to said outlet and extending towards said shelf to selectively vary the space between the outlet and the shelf.

15. The dispenser of claim 14 wherein said extension member comprises a pair of extendible lips on opposing sides of said outlet defining a channel therebetween.

16. The assembly of claim 2 further comprising a second of said actuator and a second of said linkage arm wherein the second actuator and second linkage arm are provided on an opposing side of said container from a first of said actuator and said linkage arm.

17. The assembly of claim 2, wherein said actuator body comprises a plate having a surface for contacting said at least one friction member for frictional engagement therewith.

18. The assembly of claim 17, wherein said at least one friction member comprises first and second clamp members on opposing sides of said plate to clamp said plate therebetween and said biasing member is configured to urge said clamp members together to bear on said plate.

19. The assembly of claim 2, wherein a first of said at least one friction members is configured to provide a space for said linkage arm when mounted to said dispenser body.

20. The assembly of claim 2, wherein said actuator further comprises a connector projecting laterally therefrom offset from the axis of rotation of said actuator wherein rotation of said actuator about said axis of rotation is translated into an orbital movement of said connector about said axis of rotation, wherein said connector is configured to engage said linkage arm within a slot in said linkage arm to translate rotation of the actuator into linear travel of the linkage arm.

21. The assembly of claim 20 wherein said slot is horizontally oriented.

22. The assembly of claim 20, wherein said first friction member has an arcuate slot therein and said connector travels within said arcuate slot during rotation of said actuator, said slot limiting the travel of said connector to define upper and lower limits for travel of said shelf.

23. The assembly of claim 19, wherein a second of said at least one friction members is mounted to said first friction member by a floating mount that prevents rotation of the second friction member while permitting linear travel of the second friction member for urging against the first friction member.

24. The assembly of claim 2, further comprising a handle projecting from said actuator for rotation thereof.

25. The assembly of claim 24, further comprising an indexing member adjacent to said actuator comprising indicators for alignment with said handle, wherein when aligned said indicators corresponding to predetermined spacings between said shelf and said outlet.

\* \* \* \* \*